Patented May 20, 1930

1,759,270

UNITED STATES PATENT OFFICE

FRANZ EUGEN MÜLLER, OF DRESDEN, GERMANY, ASSIGNOR TO EDGAR VORWERK, OF HAMBURG, GERMANY

PROCESS OF PRODUCING AN ARTIFICIAL SKATING GROUND

No Drawing. Application filed March 7, 1928, Serial No. 259,904, and in Germany February, 1928.

My invention relates to improvements in the production of imitation ice surfaces for skating and sliding purposes and the chief object of my invention is to provide or produce a surface for skating and sliding purposes presenting an aspect similar to ice and having properties as far as the particular purpose is regarded, similar to a natural ice surface.

Another object of my invention is to provide or produce a surface for skating or sliding purposes at comparatively low cost and in a simple, efficient manner.

With these objects in view I use for the production of an imitation ice surface, as main ingredients sulphate and carbonate of sodium and a salient feature of my invention resides in my using the said sodium salt or salts in calcined or anhydrous condition or partly in calcined and partly in crystalline condition.

Preferably I use either carbonate of sodium or sulphate of sodium, but it goes without saying that a mixture of the two sodium salts may be used just as well and will answer the purpose aimed at satisfactorily as an example. In case of carbonate of sodium I mix a certain quantity of crystallized or hydrated soda with adequate amount of calcined or anhydrous soda in a dry state and for the purpose of producing the imitation ice surface, I place the thus prepared dry mixture on a suitable base, floor or surface so as to form a layer thereon of the required or preferred thickness. Subsequently I add to the layer of the mixed sodium salt a predetermined quantity of water, that is to say, in exactly the proper proportion calculated for answering a complete crystallization of the calcined or anhydrous soda, and allow the mass to stand and congeal.

It will be seen that the addition of a calculated amount of water serves the purpose of transforming or converting the calcined soda into the crystallized state and moreover, the purpose of causing the thus homogenized mass or layer to congeal and solidify. If it is desired or preferred to increase the slipperiness of the solidified layer of congealed soda any appropriate agent suited for improving the slipperiness of the said surface may be employed in the usual manner, preferably by coating the said surface therewith.

In case of employing sulphate of sodium instead of soda I proceed in a similar way using a mixture of crystallized sodium sulphate and calcined or anhydrous sodium sulphate. As hereinbefore stated however, I employ sometimes a mixture of sulphate and carbonate of sodium either in calcined state or partly in calcined state and partly in crystallized condition. The employment of a calcined, anhydrous sodium salt alone is more expensive and for this reason I prefer to use a mixture of calcined and hydrated or crystallized sodium salt or salts.

When I use a mixture of calcined anhydrous salts, the same may be composed, for instance, of 106 parts by weight of calcined soda and 183 parts by weight of anhydrous sulphate of sodium.

From the foregoing, it is believed, that the advantages and novel features of my invention will be readily understood and, therefore, further detailed description is deemed unnecessary.

In reducing my invention to practice I find that the examples referred to herein as the preferred embodiments are the most efficient, but realizing that certain conditions will necessarily vary in concurrence with the adoption of my method, I desire to emphasize the fact that many a change in the details of practising the method may be resorted to when required without sacrificing any of the advantages of my invention as defined in the appended claims.

What I claim is:

1. A process for the production of imitation ice surfaces for skating and sliding sports which comprises providing, on a suitable floor or surface, a layer of a mixture containing a dry calcined anhydrous sodium salt and a crystallized, or hydrated sodium salt, and adding to the layer a calculated quantity of water sufficient to cause the calcined portion of the salt mixture to convert into the crystalline state.

2. The process for the production of imitation ice surfaces for skating and sliding purposes which comprises providing, on a suitable floor or surface, a layer of a mixture containing a sodium salt partly in calcined condition and partly in crystallized condition, and a second sodium salt partly in calcined condition and partly in crystallized condition, and adding to the said layer a calculated quantity of water sufficient to cause the calcined portions of the salt mixture to convert into the crystalline state.

3. A process for the production of imitation ice surfaces for skating and sliding purposes which comprises providing, on a suitable floor or surface, a layer of a mixture containing dry calcined carbonate of sodium and crystallized or hydrated carbonate of sodium, and adding to the layer a calculated quantity of water sufficient to cause the calcined carbonate of sodium to convert into the crystalline state.

4. A process for the production of imitation ice surfaces for sliding and skating purposes which comprises providing, on a suitable floor or surface, a layer of a mixture containing dry calcined sulphate of sodium and crystallized or hydrated sulphate of sodium, and adding to the layer a calculated quantity of water sufficient to cause the calcined sulphate of sodium to convert into the crystallized state.

5. A process for the production of imitation ice surfaces for skating and sliding purposes which comprises piling up, on a suitable floor or surface, a layer of a mixture containing dry calcined carbonate and sulphate of sodium and crystallized or hydrated carbonate and sulphate of sodium, and adding to the layer thus formed a calculated quantity of water sufficient to cause the calcined carbonate and sulphate of sodium to convert into the crystallized state.

In testimony whereof I affix my signature.

FRANZ EUGEN MÜLLER.